UNITED STATES PATENT OFFICE.

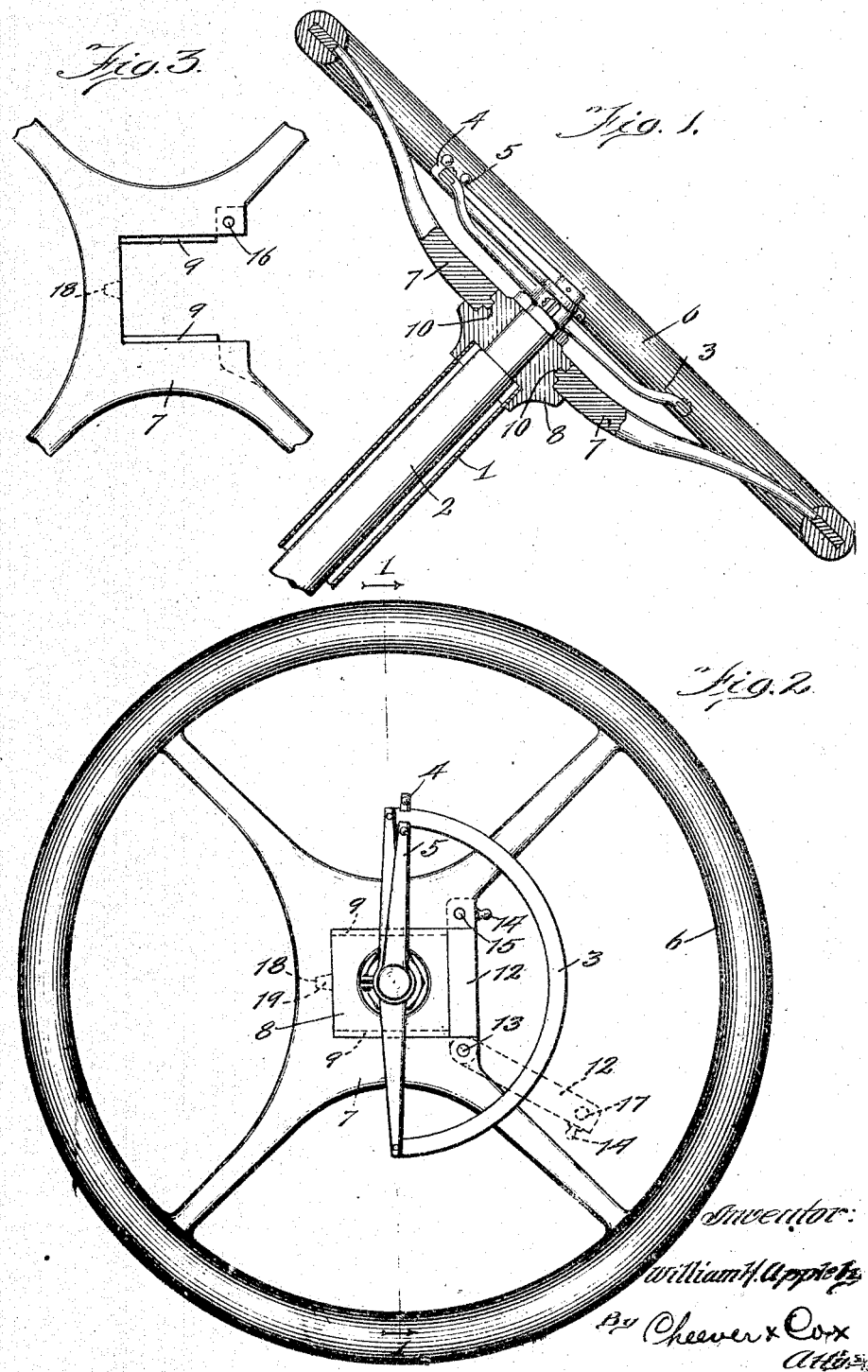

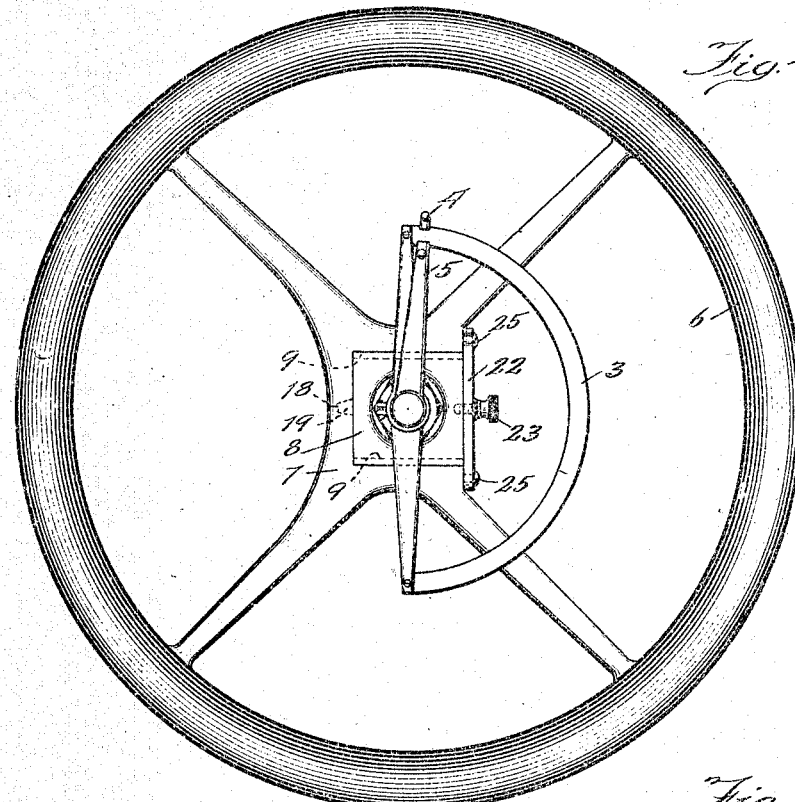
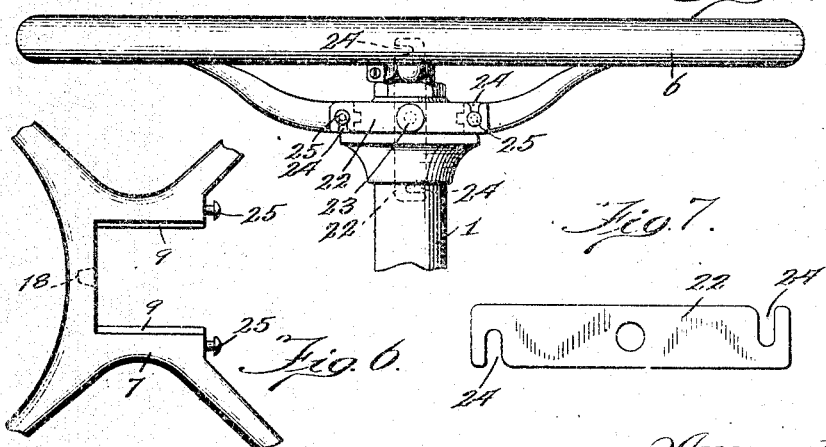

WILLIAM H. APPLEBY, OF CHICAGO, ILLINOIS.

STEERING-WHEEL.

1,187,482. Specification of Letters Patent. Patented June 20, 1916.

Application filed August 12, 1915. Serial No. 45,088.

*To all whom it may concern:*

Be it known that I, WILLIAM H. APPLEBY, a subject of the King of Great Britain, residing at Chicago, in the county of Cook and State of Illinois, have invented a certain new and useful Improvement in Steering-Wheels, of which the following is a specification.

My invention relates to steering wheels for motor vehicles, and the object of the invention is to provide means for preventing theft of the vehicle, especially on those occasions when the owner leaves his machine at the street curb of a city or town where passers-by are frequent and the machine while standing is under the casual observation of the police and private citizens. It is true, of course, that a vehicle cannot be stolen, either under its own power or by being towed, unless some means is provided for steering it, and according to my invention I provide means whereby the steering wheel may be readily detached so that the owner when he leaves the vehicle may take the steering wheel with him.

My invention not only renders the wheel readily attachable and detachable, but prevents an ordinary steering wheel from being substituted for a wheel embodying my invention.

I accomplish my object by the mechanism illustrated in the accompanying drawings in which, Figure 1 is an axial section of a steering wheel embodying my invention. The plane of section is indicated by the line 1—1, Fig. 2. Fig. 2 is a face view of the part shown in Fig. 1. Fig. 3 is a detail view showing the hub of a wheel embodying my invention. Fig. 4 is analogous to Fig. 2, but shows a modification of my invention. Fig. 5 is an edge view of the wheel and associated parts shown in Fig. 4. Fig. 6 is a detail view of a hub embodying the modifications shown in Figs. 4 and 5. Fig. 7 is a detail view of the latch employed in the form of device shown in Figs. 4, 5 and 6.

Similar numerals refer to similar parts throughout the several views.

As is usual, in many types of motor vehicles, the steering post 1 is hollow and rotatable about its longitudinal axis and incloses the stationary rod 2 which supports the segment 3. The control levers 4 and 5 coöperate with said segment to control the gas and spark in the well known manner. So far as these described parts are concerned, the construction is the one usually employed in so-called "gas" cars; that is, cars operated by internal combustion engines.

In my construction the steering wheel 6, instead of being attached directly to the steering post, in accordance with the most common construction, has a hub 7 of special configuration designed to coöperate with a center block 8. Said block is rigidly secured to the upper end of the steering post, as best shown in Fig. 1, and is rotatable upon the non-rotatable control rod 2.

Referring particularly to the design shown in Figs. 1, 2 and 3, the wheel hub 7 forms a rectangle open at one side, the two parallel sides being provided with fins or tongues 9 fitting into grooves 10 formed in the center block. As a result of this construction the wheel is slidable onto and off from the center block in a plane perpendicular to the axis of the steering post. The post is held in position upon the center block by a hinged locking bar 12 pivoted to the hub 7 upon the pin 13, as best shown in Fig. 2. By preference this bar is provided with a handle 14 for ready manipulation, and when in closed position prevents relative movement between the hub and the center post. By preference the locking bar is held closed by means of a pin 15 which passes through an aperture 16 in the hub and through a corresponding aperture 17 at the outer end of the bar.

A socket 18 is formed in the hub opposite to the open side thereof, as best shown in Fig. 3. This is adapted to receive a pin 19, as best shown in Fig. 2. The pin and socket are capable of performing a dual function. In the first place the pin serves somewhat as a dowel and holds the parts tightly and prevents lost motion between the wheel and the steering post. In the second place it acts as a guard to prevent a strange wheel from being pushed home to a position where it may be locked in place. To illustrate, it is evident that the socket on the wheel must be capable of receiving the pin; but on different cars the pins may be differently placed or differently shaped and the number of pins may be varied. As the pin and socket are hidden when the wheel is in place the number, shape and arrangement of the pins cannot be observed and an intruder would have difficulty in knowing what to prepare for. An intruder, therefore, would, as a practical matter, be unable to provide himself with a proper wheel to fit, and hence would have difficulty in getting away with the car. In addition, I prefer to place corresponding members on the center block and on the hub. By this means if a would-be thief is seen to be carrying or attempting to use a wheel of my general description, the police may readily check up upon him.

Referring to the modification shown in Figs. 4 to 7, the construction is the same as in the form hereinabove described except as to the mechanism for holding the hub locked onto the center block. In this modified form, the locking bar instead of remaining with the wheel, remains with the center block. Said locking bar 22, shown separately in Fig. 7, is pivoted to the side of the block upon the cap screw 23. Near the end of the bar are notches 24 which fit over headed pins 25 fastened to the hub, as shown separately in Fig. 6. The notches are oppositely placed, one opening upward and the other downward, with the result that when the bar is rotated to horizontal position, as shown in full lines in Fig. 5, the bar will engage the headed pins and prevent the wheel from shifting relatively to the block. When the locking bar is rotated away from the pins, as suggested by dotted lines in Fig. 5, the hub is free to be withdrawn from the center block. The head of the cap screw 23 is preferably knurled so that it may be readily manipulated by the user. By tightening up the cap screw when the bar is in locking position the bar will be prevented from becoming accidentally unlocked as a result of the vibration of the vehicle.

In operation, when the owner wishes to leave his car unattended in a frequented thoroughfare, he draws up to the curb or other parking place and releases the locking bar 12 or 22 depending upon the form with which his car is equipped. He then shifts the wheel laterally until the hub slides off the center block and disengages the same. The wheel may then be removed and the owner takes it with him, thus removing from the car the only means, practically speaking, whereby it may be steered. Without a steering wheel it is practically certain that no unauthorized person can make off with the car. On account of the peculiar formation of the center block and hub it would be useless for a would-be thief to provide himself with an ordinary steering wheel, for an ordinary steering wheel could not be substituted for a wheel of my construction, and it will be remembered also that it would be impractical for a thief to spend any considerable time in trying to fit a false wheel to the center block for his actions would, with reasonable certainty, be noted and an alarm given. On account of the tongue and groove connection between the center block and hub it is a simple matter to provide different cars with tongues and grooves of different dimensions, and in fact the blocks may be of different widths thus requiring a vehicle thief to provide himself with a number of steering wheels or with a steering wheel having a special adapter—a thing which would at once raise suspicion and render the attempt to steal the car highly hazardous.

Having thus described my invention, what I claim as new and desire to secure by Letters Patent, is:

1. In a motor vehicle, a steering post, a center block fastened thereto, and a steering wheel having a hub detachably attachable to said block, said hub being open at the top for exposing the top of the steering post and being open at the side for permitting the wheel to be removed by a sidewise movement of the wheel.

2. In a motor vehicle, a steering post, a center block fastened thereto, and a steering wheel having a hub fitting the center block on three sides thereof, the top of the block being flush with the top of the adjacent portions of the hub thereby exposing the top of the block and of the steering post, the fourth side of the hub being open and unobstructed by any part of the wheel, whereby the wheel may be completely removed by shifting it sidewise.

3. In a motor vehicle, a steering post, a center block fastened thereto, a steering wheel having a hub detachably attachable to said block, said hub being open at the top for exposing the top of the steering post and being open at the side for permitting the wheel to be removed by a sidewise movement, and guides connecting the hub and the center block, said guides running transversely to the side of the hub which is open, and the wheel being free from obstructions in the line of the guides, within a distance equal to the length of the guided portion of the center block.

4. A motor vehicle having a steering post, a rectangular center block fastened thereto, a steering wheel having a hub fitting the sides of said block, said hub being open at the top for exposing the top of the steering post and having one side open whereby it may be withdrawn laterally, and a locking bar for closing the opening in the hub to hold the wheel in engagement with the block.

5. A motor vehicle having a steering post, a center block fastened thereto, a steering wheel having a hub engaging said block on three sides, said hub being open at the top and thereby exposing the top of the steering post, a tongue and groove connection between said block and said hub, the tongues and grooves lying in a plane transverse to the length of the steering post and extending toward and from the open side of the hub, and means for retaining the hub and the block in engagement.

6. A motor vehicle having a steering post, a rectangular center block rigidly fastened thereto in a plane transverse to the axis of the post, a steering wheel having a hub inclosing said block on three sides, said hub being open at the top for exposing the top of the steering post, movable means for temporarily closing the fourth side of the hub for retaining the block in position, and a pin and socket connection between the block and the hub arranged opposite to the side opening in the hub for the purpose described.

In witness whereof, I have hereunto subscribed my name.

WILLIAM H. APPLEBY.